(12) United States Patent
Choi et al.

(10) Patent No.: US 10,427,747 B2
(45) Date of Patent: Oct. 1, 2019

(54) BICYCLE FRAME STRUCTURE HAVING A DROP-OUT

(71) Applicants: HYUNDAI MOTOR COMPANY, Seoul (KR); KIA MOTORS CORPORATION, Seoul (KR)

(72) Inventors: Jungnam Choi, Seongnam-si (KR); Sung Dae Lim, Gunpo-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 112 days.

(21) Appl. No.: 15/692,945

(22) Filed: Aug. 31, 2017

(65) Prior Publication Data

US 2018/0065704 A1 Mar. 8, 2018

(30) Foreign Application Priority Data

Sep. 2, 2016 (KR) .................. 10-2016-0113201

(51) Int. Cl.
| | |
|---|---|
| *B62K 19/30* | (2006.01) |
| *B60B 27/02* | (2006.01) |
| *B62K 19/02* | (2006.01) |
| *B62K 19/34* | (2006.01) |
| *B62M 9/16* | (2006.01) |
| *B62K 3/04* | (2006.01) |
| *B62K 19/22* | (2006.01) |
| *B62K 25/02* | (2006.01) |

(52) U.S. Cl.
CPC ............ *B62K 19/30* (2013.01); *B60B 27/026* (2013.01); *B62K 3/04* (2013.01); *B62K 19/02* (2013.01); *B62K 19/22* (2013.01); *B62K 19/34* (2013.01); *B62K 25/02* (2013.01); *B62M 9/16* (2013.01)

(58) Field of Classification Search
CPC ................................. B62K 25/02; B62M 9/16
See application file for complete search history.

(56) References Cited

U.S. PATENT DOCUMENTS

| | | | | |
|---|---|---|---|---|
| 501,625 | A | * | 7/1893 | Percy ...................... B62M 9/16 |
| | | | | 474/116 |
| 517,294 | A | * | 3/1894 | Prince ..................... B62M 9/16 |
| | | | | 474/116 |

(Continued)

FOREIGN PATENT DOCUMENTS

| | | | | |
|---|---|---|---|---|
| GB | 2561547 | A | * 10/2018 | ............. B62L 1/005 |
| KR | 100938175 | B | 1/2010 | |

(Continued)

*Primary Examiner* — Kevin Hurley
(74) *Attorney, Agent, or Firm* — Lempia Summerfield Katz LLC

(57) ABSTRACT

A bicycle frame structure has a drop-out and includes: a fixing bracket having a rail groove formed in a frontward and rearward direction and fixed to one side of the frame; a movement member mounted to the fixing bracket to be movable forward and backward along the rail groove; a drop plate fixed to the movement member and having a drop-out formed therein for fixing a wheel; and an adjustment bolt screw-engaged by penetrating one side of the movement member. A front end of the adjustment bolt is supported by a fixing support formed in the fixing bracket. The movement member is moved along the rail groove according to rotation of the adjustment bolt.

9 Claims, 4 Drawing Sheets

(56) References Cited

U.S. PATENT DOCUMENTS

| | | | | |
|---|---|---|---|---|
| 641,637 | A * | 1/1900 | Caswell | B62M 9/16 |
| | | | | 280/288 |
| 1,001,972 | A * | 8/1911 | McKellar | B62M 9/16 |
| | | | | 144/195 |
| 2,475,806 | A * | 7/1949 | Simpson | B62M 9/16 |
| | | | | 280/288 |
| 7,637,830 | B2 * | 12/2009 | Greilinger | F16H 7/14 |
| | | | | 474/116 |
| 7,854,441 | B2 * | 12/2010 | Scurlock | B62K 25/02 |
| | | | | 248/200 |
| 8,740,239 | B2 * | 6/2014 | Lumpkin | B62K 19/30 |
| | | | | 280/285 |
| 8,899,606 | B2 * | 12/2014 | Cocalis | B62K 3/02 |
| | | | | 280/281.1 |
| 8,998,236 | B2 * | 4/2015 | Trimble | B62K 25/286 |
| | | | | 280/281.1 |
| 9,415,828 | B2 * | 8/2016 | Norstad | B62K 19/24 |
| 2007/0278055 | A1 * | 12/2007 | Chen | B62K 19/38 |
| | | | | 188/2 D |
| 2017/0267308 | A1 * | 9/2017 | Geissler | B62K 25/02 |
| 2018/0050758 | A1 * | 2/2018 | Pfeiffer | B62K 25/02 |

FOREIGN PATENT DOCUMENTS

| KR | 1020110023604 A | 3/2011 |
|---|---|---|
| KR | 1020160045046 A | 4/2016 |
| KR | 1020160074267 A | 6/2016 |

\* cited by examiner

BICYCLE FRAME STRUCTURE HAVING A DROP-OUT

CROSS-REFERENCE TO RELATED APPLICATION

This application claims priority to and the benefit of Korean Patent Application No. 10-2016-0113201 filed in the Korean Intellectual Property Office on Sep. 2, 2016, the entire contents of which are incorporated herein by reference.

BACKGROUND (a) Field of the Disclosure

The present disclosure relates to a bicycle frame including a drop-out for mounting a wheel to the frame.

(b) Description of the Related Art

A conventional bicycle frame is formed of a head tube, a seat tube, a top tube, a down tube, a seat stay, and a chain stay.

A steering handle or handle bar connection body is connected to an upper end of the head tube. A front wheel rotation connection body is connected to a lower end of the head tube. A saddle connection body is connected to an upper end of the seat tube. A chain driver is connected to a lower end of the seat tube.

The top tube and the down tube connect the head tube and the seat tube for supporting the head tube and the seat tube. The seat stay and the chain stay support a rear wheel rotation connection body and the seat tube by connecting the rear wheel rotation connection body and the seat tube.

The bicycle frame includes both the top tube and the down tube, but a main tube may be connected between the head tube and the seat tube as necessary.

The conventional bicycle frame is manufactured by cutting a top tube, a down tube, and a seat tube, respectively, using a tube as a main material, and respectively welding them. However, productivity is deteriorated and production cost may be increased because the manufacturing process is difficult to automate.

Thus, recently, a study on improving productivity in manufacturing of the bicycle frame has been conducted by performing hot stamping on a plate material and bonding the left and right portions thereof together.

Further, conventionally, a metallic chain is used to transmit torque of a crank to a sprocket of a rear wheel. However, recently, a belt has been used to reduce noise and weight.

The above information disclosed in this Background section is only to enhance understanding of the background of the disclosure and therefore it may contain information that does not form the prior art that is already known in this country to a person of ordinary skill in the art.

Korean Patent Publication No. 10-2011-0023604 discloses a prior art bicycle frame.

SUMMARY

The present disclosure has been made in an effort to provide a bicycle frame structure having a drop-out for mounting a rear wheel in a frame and for enabling alignment of the rear wheel. The present disclosure relates to a bicycle frame formed by stamping a left panel and a right panel and bonding the left panel and the right panel to each other. The present disclosure also relates to such a bicycle frame including a drop-out for mounting a wheel to the frame.

A bicycle frame structure has a drop-out according to an embodiment of the present disclosure. The bicycle frame structure includes: a fixing bracket having a rail groove formed in a frontward and rearward direction and fixed to one side of the frame; a movement member mounted to the fixing bracket to be movable forward and backward along the rail groove; a drop plate fixed to the movement member and having a drop-out formed therein for fixing a wheel; and an adjustment bolt screw-engaged by penetrating one side of the movement member. A front end of the adjustment bolt is supported by a fixing support formed in the fixing bracket. The movement member is moved along the rail groove according to rotation of the adjustment bolt.

A protrusion may be integrally formed in the fixing bracket. The protrusion may be fixed to the frame by being inserted into one side of the frame.

A cutout portion may be formed along a diameter direction in one side of the frame. The protrusion may be inserted into the cutout.

The frame may include a seat stay and a chain stay. The cutout portion may be formed in a portion where the seat stay and the chain stay meet.

The bicycle frame structure having the drop-out may further include a connection pin that connects the movement member and the drop plate to each other by penetrating the rail groove.

A quick release (QR) axle or a thru-axle that is disposed in a central axis of rotation of a rear wheel or a front wheel may be disposed in the drop-out.

The frame may include a right panel and a left panel that are press-molded. The right panel and the left panel may be bonded to each other such that a hollow pipe structure may be formed.

A screw through-hole may be integrally formed in one side of the fixing bracket. The adjustment bolt may be screw-engaged to the screw through-hole.

The fixing support may be provided in the fixing bracket and may be closely attached to a front end surface of the adjustment bolt and moving the movement member in one direction according to a rotation position of the adjustment bolt.

The fixing support and the protrusion may be integrally connected with each other.

Fixing bolt holes may be provided in the fixing bracket for coupling with the frame.

According to the present disclosure, the fixing bracket is mounted to the frame, which has a stamped form. A plate is mounted to the fixing bracket where a drop-out that can move along a rail groove. The drop-out is movable forward and backward using an adjustment bolt such that alignment of the rear wheel can be easily performed.

Further, one side of the stamping frame is cut and the fixing frame is fixed to the cutout portion such that a belt can be easily installed to a crank and a sprocket.

DETAILED DESCRIPTION OF THE EMBODIMENTS

Figure 1:
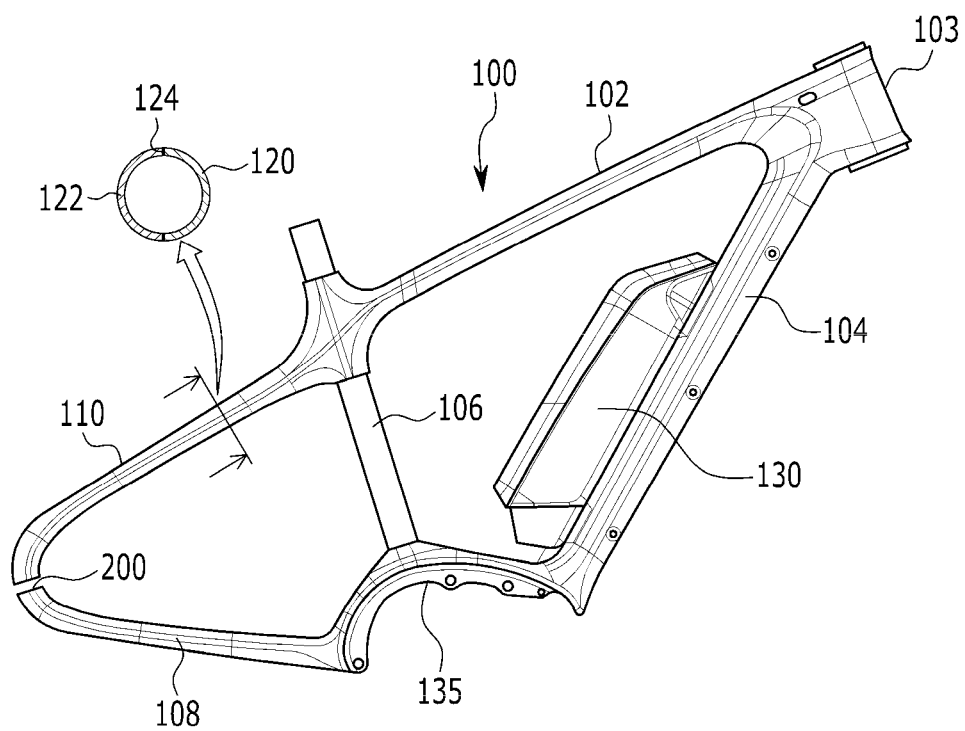
FIG. 1 is a side view of a bicycle frame structure according to an embodiment of the present disclosure.

Hereinafter, embodiments of the present disclosure will be described in detail with reference to the accompanying drawings.

However, the size and thickness of each component illustrated in the drawings are arbitrarily shown for better understanding and ease of description, and the present disclosure is not limited thereto. Thicknesses of several portions and regions are enlarged for clearly describing the disclosure.

Parts that are irrelevant to the description will be omitted to clearly describe the embodiments of the present disclosure, and the same or similar constituent elements will be designated by the same reference numerals throughout the specification. The following reference symbols are used throughout the description and drawings:

| | |
|---|---|
| 100: frame | 102: top tube |
| 103: head tube | 104: down tube |
| 130: battery | 106: seat tube |
| 135: motor mounting portion | 110: seat stay |
| 108: chain stay | 200: cutout portion |
| 122: left panel | 120: right panel |
| 124: bonding portion | 112: wheel mounting portion |
| 402: fixing bracket | 410: connection pin hole |
| 406: rail groove | 408: movement member |
| 414: drop plate | 416: drop-out |
| 420: control bolt | 422: fixing nut |
| 412: fixing support | 404: protrusion |
| 421: screw through-hole | 450: fixing bolt hole |
| 45: connection pin | |

In the following description, names of constituent elements are classified as a first, a second, and the like so as to discriminate constituent elements having the same name. However, the names are not intended to be limited to the order of such classifications in the description below.

FIG. 1 is a side view of a bicycle frame structure according to an embodiment of the present disclosure.

Referring to FIG. 1, a bicycle frame 100 includes a head tube 103, a top tube 102, a down tube 104, a seat tube 106, a seat stay 110, a chain stay 108, a motor mounting portion 135, and a cutout portion 200.

In a cross-section of the seat stay 110, the seat stay 110 may include a left panel 122 and a right panel 120. The left panel 122 and the right panel 120 may be welded to each other through a bonding portion 124.

In the left panel 122 and the right panel 120, the terms "left" and "right" are used to distinguish constituent elements, and thus are not substantially limited to the left side and the right side.

A battery 130 may be fixed to an upper portion of the down tube 104. The motor mounting portion 135 may be integrally connected with the chain stay 108, the seat tube 106, and the down tube 104.

In an embodiment of the present disclosure, the top tube 102, the down tube 104, and the chain stay 108 may be formed by welding left and right panels, like the seat stay 110, as described above.

Figure 2:
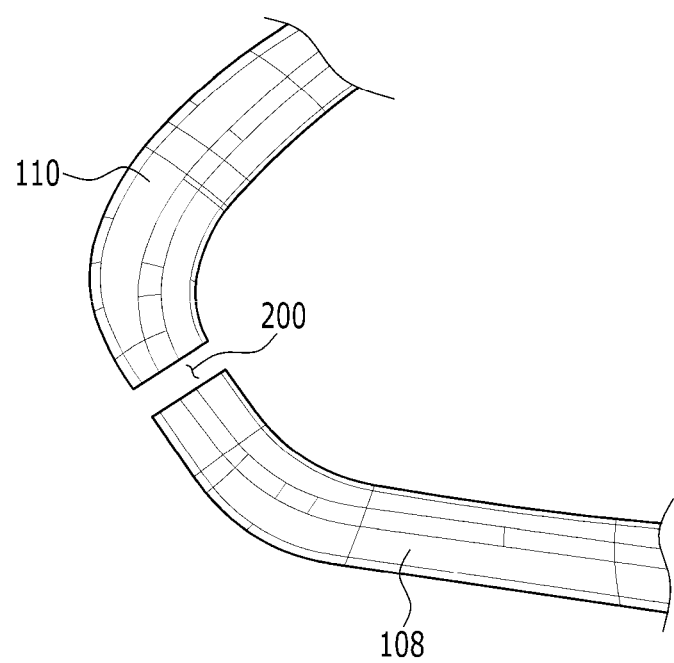
FIG. 2 is a partially detailed side view of the bicycle frame structure according to the embodiment of FIG. 1.

FIG. 2 is a partially detailed side view of the bicycle frame structure of FIG. 1 and according to an embodiment of the present disclosure.

Referring to FIG. 2, the cutout portion 200 is formed at a portion where the seat stay 110 and the chain stay 108 meet. The cutout portion 200 may be formed by cutting one side of the frame in a diameter direction.

In other words, the cutout portion 200 is formed in a diameter direction of the tube at a bent portion of the portion where the seat stay 110 and the chain stay 108 meet.

Figure 3:
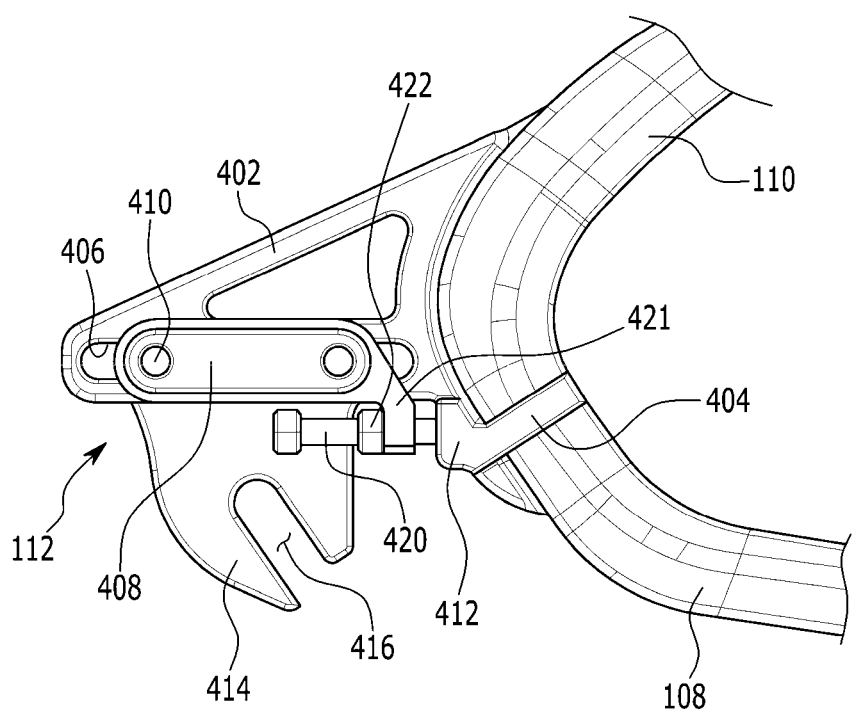
FIG. 3 is a detailed side view of a wheel mounting portion in the bicycle frame according to an embodiment of the present disclosure.
Figure 4:
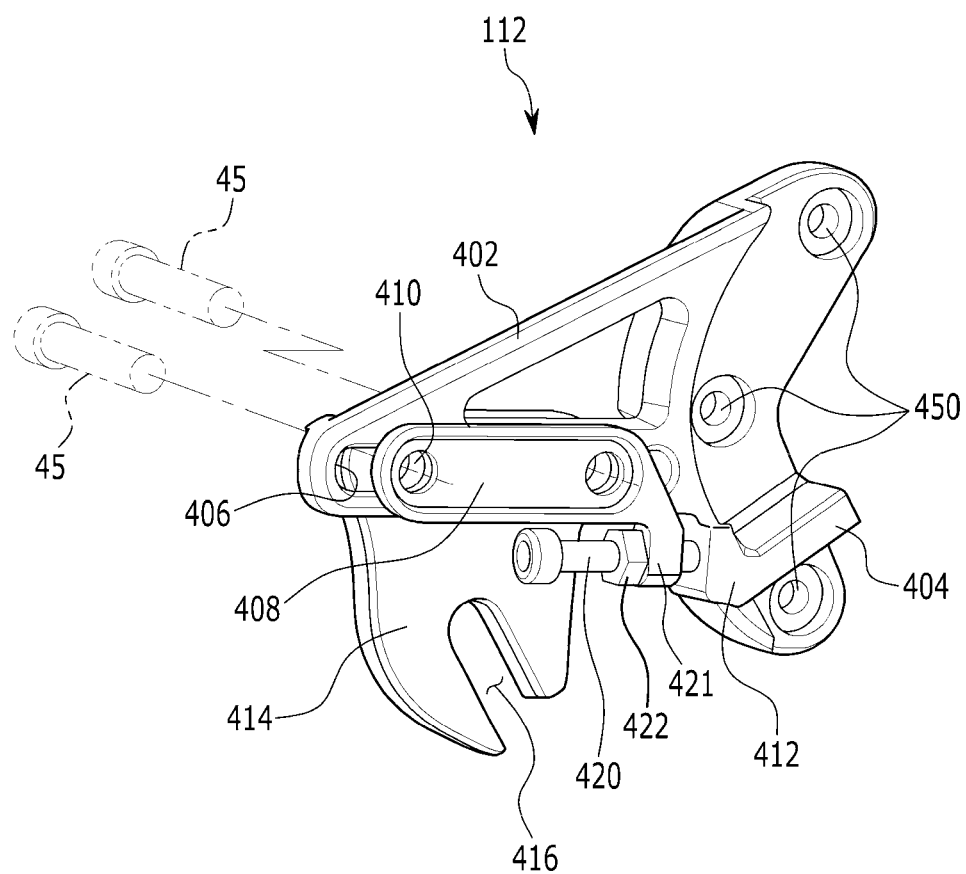
FIG. 4 is a perspective view of the wheel mounting portion mounted to the bicycle frame according to the embodiment of FIG. 3.

FIG. 3 is a detailed side view of a wheel mounting portion in the bicycle frame according to an embodiment of the present disclosure. FIG. 4 is a perspective view of the wheel mounting portion mounted to the bicycle frame of FIG. 3 and according to an embodiment of the present disclosure.

Referring to FIG. 3 and FIG. 4, the wheel mounting portion 112 includes a fixing bracket 402 where a rail groove 406 is formed. The wheel mounting portion 112 includes a movement member 408 where a connection pin hole 410 is formed. The wheel mounting portion 112 includes a drop plate 414 where a drop-out 416 is formed. The wheel mounting portion 112 also includes an adjustment bolt 420, a fixing nut 422, a protrusion 404, and a screw through-hole 421.

The protrusion 404 is integrally formed at a front lower portion of the fixing bracket 402. The protrusion 404 may be inserted into the cutout portion 200.

Fixing bolt holes 450, where fixing bolts are inserted, may be formed at predetermined intervals in a front end of the fixing bracket 402.

The fixing bracket 402 may be fixed to the seat stay 110 and the chain stay 108 through the fixing bolt holes 450.

A fixing support 412 is formed at a rear portion of the protrusion 404. The fixing support 412 may be integrally formed to a front lower portion of the fixing bracket 402.

The fixing bracket 402 has the rail groove 406 formed and oriented in a frontward and rearward direction. The movement member 408 is engaged to the rail groove 406 to be movable forward and backward along the rail groove.

The drop plate 414 is disposed at a location corresponding to the movement member 408. Connection pins 45 connect the movement member 408 and the drop plate 414 to each other by penetrating the connection pin holes 410 and the rail groove 406.

Thus, the drop plate 414 and the movement member 408 are movable forward and backward along the rail groove 406.

The drop-out 416 is formed to be inclined downward in a lower portion of the drop plate 414. A QR axle or a thru-axle of a rear wheel (not shown) may be fixed to the drop plate 414 by being inserted through the drop-out 416.

A structure and a function of the QR axle and the thru-axle are well known in the art, and therefore no further detailed description is provided.

The screw through-hole 421 is integrally formed in a front lower end of the movement member 408. The adjustment bolt 420 contacts the fixing support 412 by penetrating the screw through-hole 421.

When the adjustment bolt 420 is tightened, a front end of the adjustment bolt 420 pushes the fixing support 412 forward. Correspondingly, the adjustment bolt 420 and the movement member 408 move rearward.

Accordingly, the rear wheel mounted to the drop-out 416 of the drop plate 414 moves rearward.

Even though a position of the drop plate 414 may be fixed by tightening the connection pin 45, the drop plate 414 may be moved toward due to tension of a belt or a chain applied to the rear wheel. But movement of the drop plate 414 may be prevented by the contact of the adjustment bolt 420 with the fixing support 412.

In the embodiment of the present disclosure, one of the fixing brackets 402 is disposed in the left side and in the right side of the bicycle frame. The fixing nut 422 provided in each of the fixing brackets 402 may tighten or release the corresponding adjustment bolts 420 to easily adjust left and right alignment of the rear wheel.

In addition, when a crank where a pedal is provided and a sprocket of the rear wheel are connected to apply torque of the pedal to the rear wheel, the belt may be easily mounted to the sprocket and the crank through the cutout portion 200.

Referring to FIG. 3 and FIG. 4, fixing bolts (not shown) fix the fixing bracket 402 to the seat stay 110 by penetrating the fixing bolt holes 450 provided in the upper portion of the fixing bracket 402. Further, fixing bolts fix the fixing bracket 402 to the chain stay 108 by penetrating the fixing bolt holes 450 provided in a lower portion of the fixing bracket 402.

In addition, the fixing nut 422 is engaged between a bolt head of the adjustment bolt 420 and the screw through-hole 421 to fix a selected or adjusted position of the adjustment bolt 420.

That is, after the drop plate 414 is positioned at a predetermined position, the drop plate 414 may be fixed by tightening the connection pin 45 and the adjustment bolt 420 and then the adjustment bolt 420 may be fixed by tightening the fixing nut 422.

While the disclosed embodiments have been described in connection with what are presently considered to be practical example embodiments, it is to be understood that the disclosure is not limited to the disclosed embodiments. On the contrary, it is intended to cover various modifications and equivalent arrangements included within the spirit and scope of the appended claims.

What is claimed is:

1. A bicycle frame structure having a drop-out, the bicycle frame structure comprising:
a fixing bracket having a rail groove formed in a frontward and rearward direction and fixed to one side of the frame;
a movement member mounted to the fixing bracket to be movable forward and backward along the rail groove;
a drop plate fixed to the movement member and having a drop-out formed therein for fixing a wheel; and
an adjustment bolt screw-engaged by penetrating one side of the movement member, wherein a front end of adjustment bolt is supported by a fixing support formed in the fixing bracket, and wherein the movement member is moved along the rail groove according to rotation of the adjustment bolt,
wherein a protrusion is integrally formed in the fixing bracket, the protrusion fixed to the frame by being inserted into one side of the frame.

2. The bicycle frame structure of claim 1, wherein a cutout portion is formed along a diameter direction in one side of the frame, and wherein the protrusion is inserted into the cutout.

3. The bicycle frame structure of claim 2, wherein the frame comprises a seat stay and a chain stay, and wherein the cutout portion is formed in a portion where the seat stay and the chain stay meet.

4. The bicycle frame structure of claim 1, further comprising a connection pin that connects the movement member and the drop plate to each other by penetrating the rail groove.

5. The bicycle frame structure of claim 1, wherein a quick release (QR) axle or a thru-axle that is disposed at a central axis of rotation of a rear wheel or a front wheel is disposed in the drop-out.

6. A bicycle frame structure having a drop-out, the bicycle frame structure comprising:
a fixing bracket having a rail groove formed in a frontward and rearward direction and fixed to one side of the frame;
a movement member mounted to the fixing bracket to be movable forward and backward along the rail groove;
a drop plate fixed to the movement member and having a drop-out formed therein for fixing a wheel; and
an adjustment bolt screw-engaged by penetrating one side of the movement member, wherein a front end of adjustment bolt is supported by a fixing support formed in the fixing bracket, and wherein the movement member is moved along the rail groove according to rotation of the adjustment bolt,
wherein the frame comprises a right panel and a left panel that are press-molded, and wherein the right panel and the left panel are bonded to each other such that a hollow pipe structure is formed.

7. A bicycle frame structure having a drop-out, the bicycle frame structure comprising:
a fixing bracket having a rail groove formed in a frontward and rearward direction and fixed to one side of the frame;
a movement member mounted to the fixing bracket to be movable forward and backward along the rail groove;
a drop plate fixed to the movement member and having a drop-out formed therein for fixing a wheel; and
an adjustment bolt screw-engaged by penetrating one side of the movement member, wherein a front end of adjustment bolt is supported by a fixing support formed in the fixing bracket, and wherein the movement member is moved along the rail groove according to rotation of the adjustment bolt,
wherein a screw through-hole is integrally formed in a front lower end of the movement member, and wherein the adjustment bolt is screw-engaged to the screw through-hole.

8. The bicycle frame structure of claim 1, wherein the fixing support and the protrusion are integrally connected with each other.

9. The bicycle frame structure of claim 1, wherein fixing bolt holes are provided in the fixing bracket for coupling with the frame.

* * * * *